United States Patent Office 2,714,062

Patented July 26, 1955

1

2,714,062

COMPOSITION FOR AND PROCESS OF RESTORING THE GREEN COLOR OF GRASS

Andrew J. Lockrey and Frank W. Koinig, Southampton, N. Y.; said Koinig assignor to said Lockrey No Drawing. Application January 7, 1955, Serial No. 480,594

12 Claims. (Cl. 71—1)

The present invention relates to the treatment of grass lawns and the like and, more particularly, to a process of immediately restoring the green color of grass which has turned brown due to a nitrogen deficiency and concurrently promoting the growth of the grass to regain its natural color.

Accordingly, an object of the present invention is to accomplish the foregoing treatment in a simple, practical and economical manner.

Another object is to accomplish the foregoing treatment with a minimum of materials.

A further object is to maintain the effects of the foregoing treatment for a substantial duration.

Other and further objects will be obvious upon an understanding of the illustrative embodiment about to be described, or will be indicated in the appended claims, and various advantages not referred to herein will occur to one skilled in the art upon employment of the invention in practice.

During the hot, dry summer months, many lawns turn partially or entirely brown which often necessitates resodding or complete reseeding to grow new grass. Also, when lawns are inundated, particularly by brackish or sea water, grass is usually killed and the lawns turn brown.

While actually there is no chemical proof as to why this takes place, we have discovered that there is a depletion of the nitrogen in the grass. Normal, healthy or "green" grass (not moisture free) has a nitrogen content of about 0.5556%, whereas "brown" grass (not moisture free) has a nitrogen content of about 0.2100%. This is a decrease of 37.77% in the nitrogen content, as shown by the Kjeldahl method for nitrogen determinations. Since brown grass shows this marked decrease in nitrogen content, we have presumed that the browning of the grass is caused by the loss of nitrogen.

This leads to the conclusion that the green color of the grass can be restored, provided that the grass still has some life, by replacing its lost nitrogen. The addition of such compounds to the soil alone take from five to seven days to show any signs of grass restoration. Even then, if successful, it may take longer for the grass to regain its normal color by natural growth processes.

Heretofore, it has been proposed to spray a solution of dye on discolored grass to immediately restore its natural color. However, such dyes have not been satisfactory because they did not "take" to the grass, did not lay evenly on the grass, or were easily washed off the grass by rain or hose sprinkling.

In accordance with the present invention, we have discovered that the addition of tannic acid and sodium potassium copper chlorophyllin to a nitrogen supplying substance, such as urea, exerts a catalytic action on the process of nitrogen absorption by the grass blades. This catalytic action allows urea or any other nitrogen liberating substance to be absorbed into the blade of grass readily as well as into its roots. The absorption of nitrogen into the blade of grass speeds up the reaction of promoting growth and color restoration. The urea, in

2 the ground, also serves as a reservoir for the grass to draw upon.

We have further discovered that a water-soluble, film-forming binder, when added to the solution, prolongs the effectiveness of the chlorophyllin compound, the tannic acid, and the urea by holding the same in intimate contact with the blades of grass long enough to promote absorption, thereby preventing the same from being washed away by subsequent rains, watering of the lawn or inundation. The binder also serves to promote uniform color distribution and initial adhesion of the solution to the blades of grass when sprayed thereon.

The material characterized herein as a water-soluble binder includes methyl cellulose and hydroxyethyl cellose. Such compounds are preferred because they are effective in small amounts and are not harmful to plants.

Urea is preferred as the nitrogen liberating substance because of its good water solubility and its high nitrogen value which is on the order of 46% by weight.

Tannic acid is preferred because of the catalytic action between it and the chlorophyllin; also, because tannic acid serves to promote the water solubility of the binder. Tannic acid is also generally available, low in cost, and has a non-harmful effect on plant life.

The proportions of tannic acid and chlorophyllin are critical and are dictated by their catalytic effect. Tannic acid may be used from 0.05 ounce to 0.162 ounce per 10 gallons of water. Chlorophyllin may be used from 100–500 mg. per 10 gallons of water.

If desired other dyes may be added to more nearly blend the color of the solution with the natural color of the grass to which it is applied. Also insecticides and fungicides may be added to the solution, although such materials are not essential to successful practice of the present invention.

The proportion of urea is critical because of the possibility of "nitrogen burn." It ranges from 40–60 ounces per 10 gallons of water per 1000 square feet. The amounts of the binder and the blended dyestuffs are not critical. From 2 to 4 ounces of binder per 10 gallons of water will give good adhesion. While 2 to 3 ounces of dyestuff per 10 gallons of water will give the desired shades.

When these materials are used in the foregoing proportions each material serves its intended function and does not adversely affect the desired function of the other materials, these materials being entirely compatible in such proportions as to accomplish the purpose of the present invention.

The preceding materials may be admixed in dry powder form and packaged in suitable quantity for ultimate consumption or may be made available in concentrated liquid form.

The following examples illustrate compositions in accordance with the present invention and the manner in which they are utilized to carry out the process.

*Example I*

A dry powder was prepared by admixing the following ingredients:

| | Ounces |
|---|---|
| Urea | 40 |
| Sodium potassium copper chlorophyllin | 1 |

This powder was dissolved in 10 gallons of water to provide an aqueous solution which was sprayed by means of a hose equipped with a conventional nozzle on 1000 square feet of lawn which had turned completely brown during the hot, dry summer weather.

The solution had a slight green tint, but was not sufficient to impart any color to the grass. At the end of five days, new growth was noticed. Further increases of urea showed new growth starting at three days and, when a ratio of 70 ounces of urea to 10 gallons of water was reached, a definite "nitrogen burn" was noticed.

*Example II*

A dry powder was prepared by admixing the following ingredients:

| | Ounces |
|---|---|
| Urea | 40 |
| Sodium potassium copper chlorophyllin | 1 |
| Tannic acid | 1 |

This powder was dissolved in 10 gallons of water and the solution was applied to 1000 square feet of brown lawn in the same manner as set forth in Example I; results of this test and further tests showed new growth in 24 hours. Growth was more noticeable in some places, because of a slightly heavier application.

*Example III*

A dry powder was prepared by admixing the following ingredients:

| | Ounces |
|---|---|
| Urea | 40 |
| Sodium potassium copper chlorophyllin | 1 |
| Blended dyestuff | 2.6 |
| Tannic acid | 1 |

This powder was dissolved and applied as in Example I, with the result that a dark green solution was obtained. When applied to the grass it immediately turned the grass green. However, upon watering, the dyestuff washed off of the grass. Again new growth was noticed in 24 hours.

*Example IV*

A dry powder was prepared by admixing the following ingredients:

| | Ounces |
|---|---|
| Urea | 40 |
| Sodium potassium copper chlorophyllin | 1 |
| Tannic acid | 1 |
| Methyl cellulose | 3 |
| Blended dyestuff | 2.6 |

This powder was dissolved as in Example I, with the result that the grass turned green immediately, but the dyestuff did not wash off when wet with water. Furthermore, new growth was noticed in less than 24 hours. In addition, the tannic acid increased the solubility of the binder.

*Example V*

A dry powder was prepared by admixing the following ingredients:

| | |
|---|---|
| Urea | 41 ounces. |
| Sodium potassium copper chlorophyllin | 0.5 gram (100–500 milligrams). |
| Tannic acid | 0.78 ounce. |
| Methyl cellulose | 2.6 ounces. |
| Blended dyestuff | 2.6 ounces. |

This powder was dissolved in 10 gallons of water to provide an aqueous solution, which was applied in the manner set forth in Example I to about 700 square feet of brown grass, which apparently was killed by salt water caused by high tides and which grass had been in such condition for four days. This grass was lying flat on the ground with no shoots standing up. In sixteen (16) hours new growth was clearly visible and three days later this grass was ready for cutting.

Seven days later this patch of grass was again inundated by salt water and, upon examination the following day, it was found that the grass, although lying flat, had a dark green color and was very much alive.

An untreated patch of grass adjacent the aforementioned patch remained completely dead, while the treated patch continued growing and remained alive.

*Example VI*

A dry powder was prepared by admixing the following ingredients:

| | Ounces |
|---|---|
| Urea | 41 |
| Sodium potassium copper chlorophyllin | 0.1 |
| Tannic acid | 0.9 |
| Methyl cellulose | 3 |
| Blended dyestuff | 2.6 |

This powder was dissolved as in Example I, and applied to another 1000 square feet of lawn in another section. The following day this lawn was covered with salt water. Three days later grass tufts pulled from this section (still under water) was green. Ten days later after the water had receded, the 1000 square feet was still green and growing.

*Example VII*

A dry powder was prepared by admixing the following ingredients:

| | Ounces |
|---|---|
| Urea | 41 |
| Methyl cellulose | 2.6 |

This powder was dissolved and sprayed on as in Example I. New growth was noticed in 30–33 hours; this is a decided decrease in the time it takes for the usual method of applying urea to show new signs of growth.

From the foregoing description, it will be seen that the present invention provides a novel and useful composition for and process of treating grass lawns to restore the same after the grass apparently had died. The composition, as applied, is not harmful to human beings or animals. Also, after treatment, the grass grows so fast that it is not necessary to water it as often, since it remains green.

It will be understood that the details and examples hereinbefore set forth are illustrative only and that the invention as broadly described and claimed is in no way limited thereby.

What is claimed is:

1. The process of reviving nitrogen deficient grass, which comprises applying to the grass an aqueous solution of urea sufficient to provide the nitrogen requirements for blades and roots of the grass and substantially smaller quantities of water soluble sodium potassium copper chlorophyllin and tannic acid in amounts sufficient to promote and accelerate absorption by the grass of said urea.

2. The process according to claim 1, wherein the solution contains a blended dyestuff in an amount sufficient to cause an immediate restoration of the green color to the grass.

3. The process according to claim 1, wherein the solution contains a water-soluble binder in an amount sufficient to promote adherence of the solution to the blades of the grass.

4. The process of restoring the green color of grass which has turned brown because of a nitrogen deficiency and concurrently promoting the growth of the grass to regain its natural color, which process comprises applying an aqueous solution to the grass consisting essentially of the following ingredients in approximate amounts:

| | | |
|---|---|---|
| Water | gallons | 10 |
| Urea | ounces | 40 |
| Water-soluble sodium potassium copper chlorophyllin | ounces | 1 |
| Tannic acid | do | 1 |
| Water-soluble binder | do | 3 |
| Blended dyestuff | do | 2.6 |

5. An aqueous solution for immediately restoring the green color of grass which has turned brown because of a nitrogen deficiency and concurrently promoting the growth of the grass to regain its natural color, consisting essentially of the following ingredients; in approximate amounts:

| | | |
|---|---|---|
| Water | gallons | 10 |
| Urea | ounces | 40 |
| Water-soluble sodium potassium copper chlorophyllin | ounces | 1 |
| Tannic acid | do | 1 |
| Water-soluble binder | do | 3 |
| Blended dyestuff | do | 2.6 |

6. A water-soluble powder for restoring the green color of grass which has turned brown and concurrently promoting the growth of the grass to regain its natural color, said powder consisting essentially of urea and water-soluble sodium potassium copper chlorophyllin.

7. A powder according to claim 6, containing tannic acid as an added ingredient thereof.

8. A powder according to claim 6, containing a water-soluble binder as an added ingredient thereof.

9. A water-soluble powder for restoring the green color of grass which has turned brown and concurrently promoting the growth of the grass to regain its natural color, consisting essentially of about 40 parts by weight of urea, 0.1 part by weight of water-soluble sodium potassium copper chlorophyllin, and 1 part by weight of tannic acid.

10. A powder according to claim 9, containing about 2.6 parts by weight of a blended dyestuff.

11. A powder according to claim 9, containing about 3 parts by weight of a water-soluble binder.

12. A water-soluble powder for immediately restoring the green color of grass which has turned brown and concurrently promoting the growth of the grass to regain its natural color, consisting essentially of the following ingredients in approximate amounts by weight:

| | |
|---|---|
| Urea | 40 |
| Water-soluble sodium potassium copper chlorophyllin | 1 |
| Tannic acid | 1 |
| Water-soluble binder | 3 |
| Blended dyestuff | 2.6 |

No references cited.